US008256089B2

(12) United States Patent
Pionetti

(10) Patent No.: US 8,256,089 B2
(45) Date of Patent: Sep. 4, 2012

(54) METHOD OF COVERING INSIDE SURFACE OF STEEL CONNECTION PART

(75) Inventor: Francois-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 1281 days.

(21) Appl. No.: 11/988,255

(22) PCT Filed: Jun. 15, 2006

(86) PCT No.: PCT/FR2006/001354
§ 371 (c)(1),
(2), (4) Date: Jan. 3, 2008

(87) PCT Pub. No.: WO2007/006877
PCT Pub. Date: Jan. 18, 2007

(65) Prior Publication Data
US 2009/0129853 A1 May 21, 2009

(30) Foreign Application Priority Data
Jul. 5, 2005 (FR) .................................... 05 07153

(51) Int. Cl.
*B23P 11/00* (2006.01)
*F16L 9/147* (2006.01)
*F16L 13/02* (2006.01)
(52) U.S. Cl. ........ 29/458; 29/527.1; 29/527.2; 138/145; 118/56; 118/318; 285/55; 285/288.1

(58) Field of Classification Search .................. 29/458, 29/527.1, 527.2; 138/141, 145; 427/231, 427/233, 238, 183; 118/318, 56, 409; 285/55, 285/288.1
See application file for complete search history.

(56) References Cited

U.S. PATENT DOCUMENTS

| 3,376,152 | A | | 4/1968 | Okamoto et al. | |
| 3,814,616 | A | * | 6/1974 | Kondo et al. | 427/476 |
| 3,974,306 | A | * | 8/1976 | Inamura et al. | 427/183 |
| 4,420,508 | A | * | 12/1983 | Gibson | 427/183 |
| 4,490,411 | A | * | 12/1984 | Feder | 427/543 |
| 5,059,453 | A | * | 10/1991 | Bernsten, Jr. | 427/231 |
| 6,827,780 | B2 | * | 12/2004 | Bertellotti | 118/622 |
| 2007/0284872 | A1 | | 12/2007 | Pionetti | |

FOREIGN PATENT DOCUMENTS

| DE | 3437697 | | 7/1985 |
| FR | 2 876 773 | | 10/2004 |
| GB | 585395 | | 2/1947 |
| GB | 2 218 488 | A | 11/1989 |
| GB | 2 298 256 | A | 8/1996 |
| GB | 2 391 547 | A | 2/2004 |

(Continued)

*Primary Examiner* — Jermie Cozart
(74) *Attorney, Agent, or Firm* — Cozen O'Connor

(57) ABSTRACT

A method of covering the inside surface of a steel connection part having an empty inside volume defined by the inside surface, with a liner constituted by a layer of substantially uniform thickness of a thermoplastic material. The connection part including at least two open tubular ends suitable for being connected respectively to at least two steel pipe elements, each including the same internal liner. A rotary molding method is implemented in which the connection part acts as a mold. A connection part obtained by the rotary lining method is provided, and methods of assembling a connection part, as obtained by rotary lining, with a likewise lined pipe element.

15 Claims, 10 Drawing Sheets

FOREIGN PATENT DOCUMENTS

| | | | |
|---|---|---|---|
| JP | 58067383 | | 4/1983 |
| JP | 01152010 A | * | 6/1989 |
| JP | 03278864 A | * | 12/1991 |
| WO | WO 2004/011840 A1 | | 2/2004 |
| WO | WO 2004/015321 A1 | | 2/2004 |

* cited by examiner

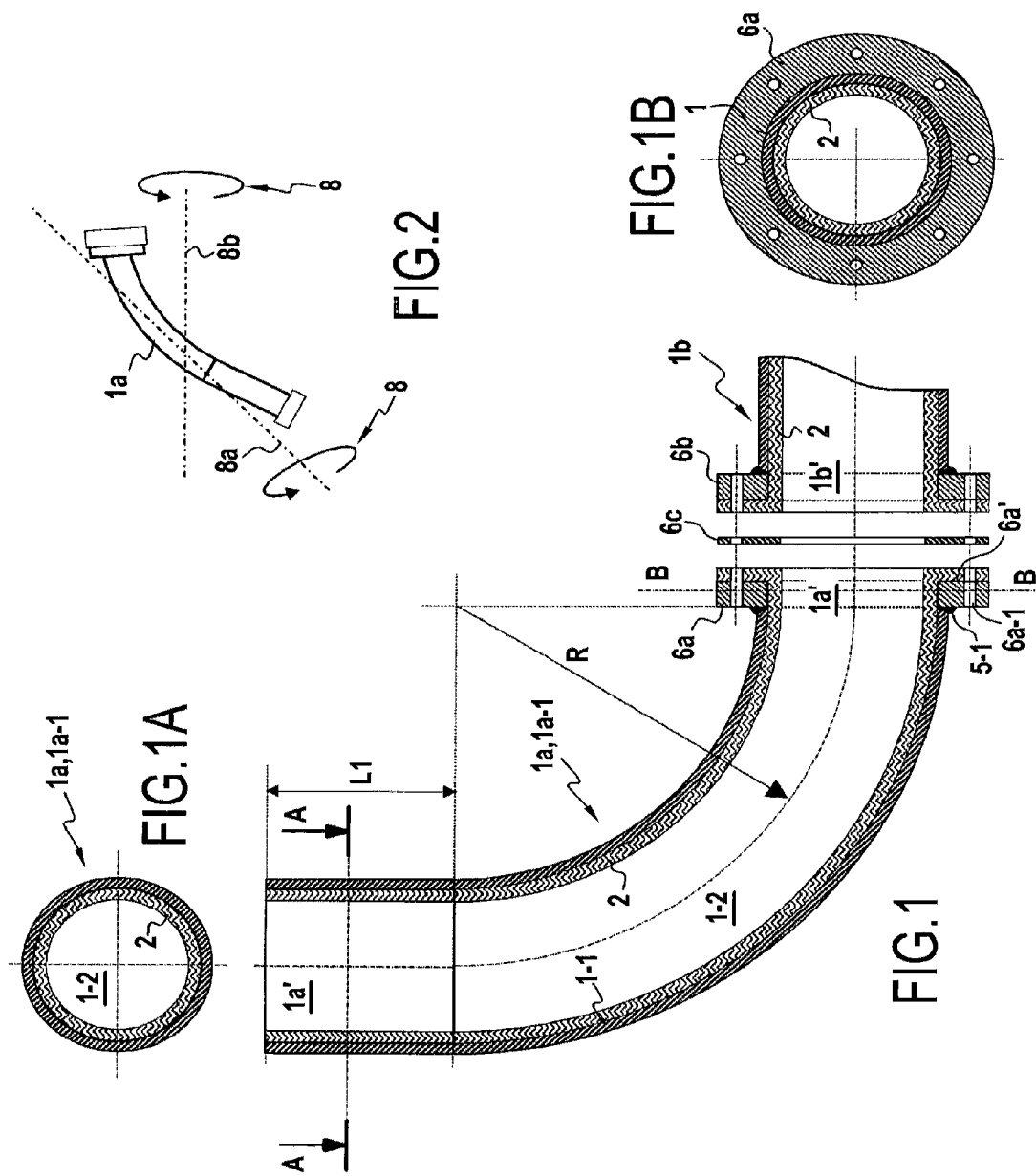

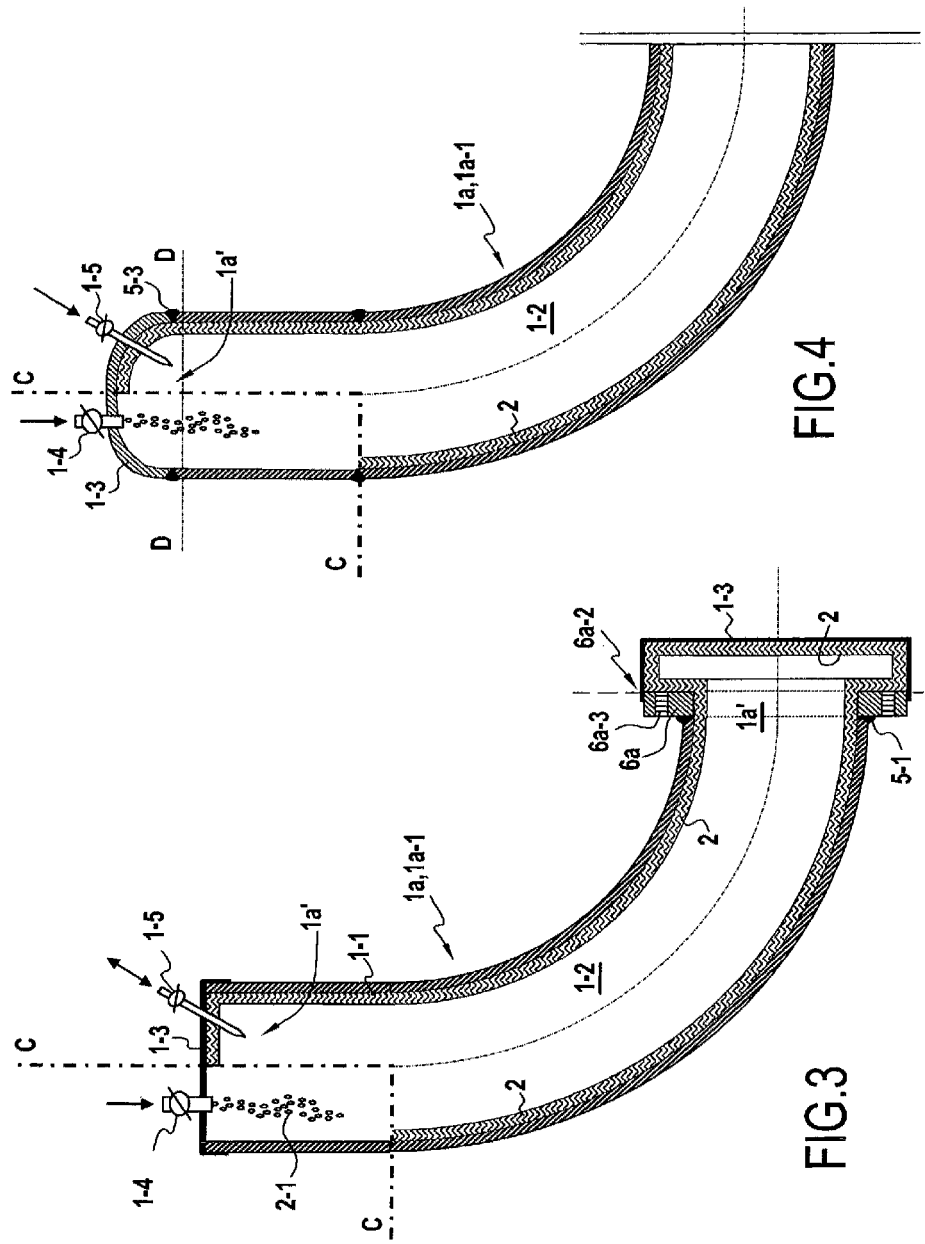

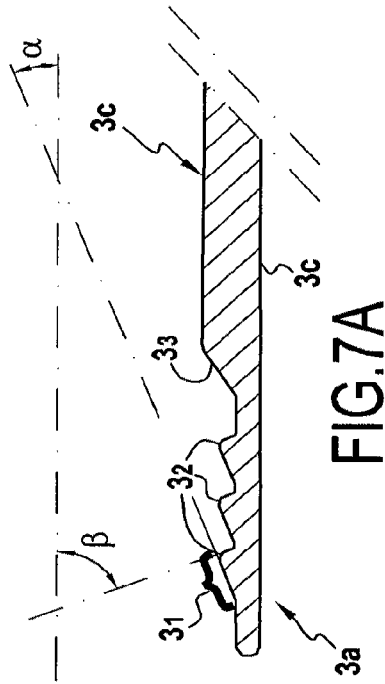
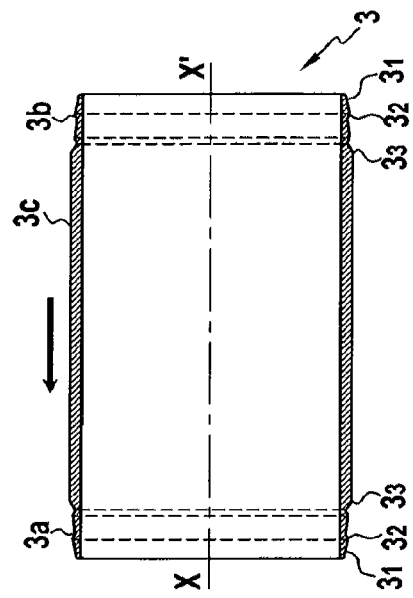
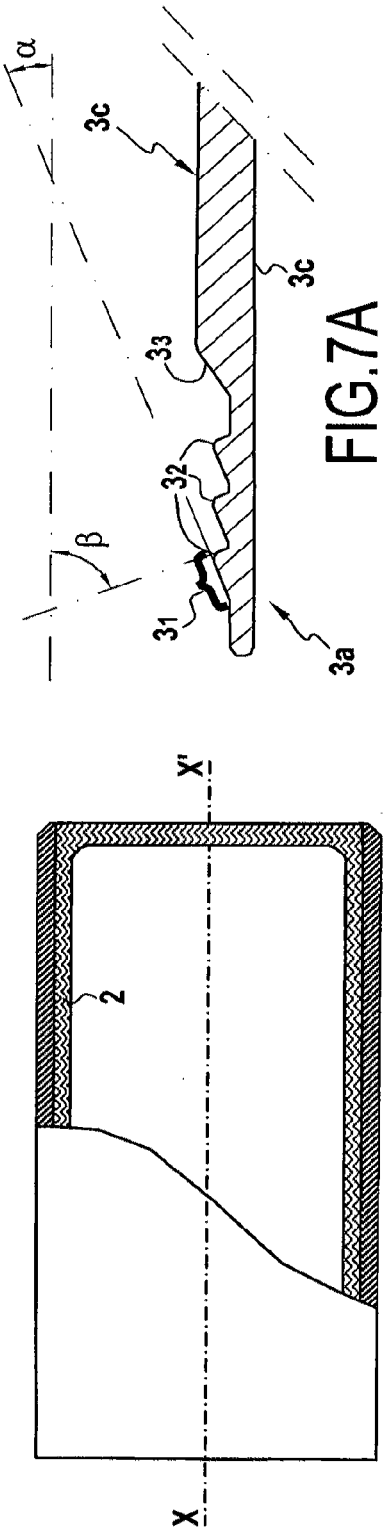
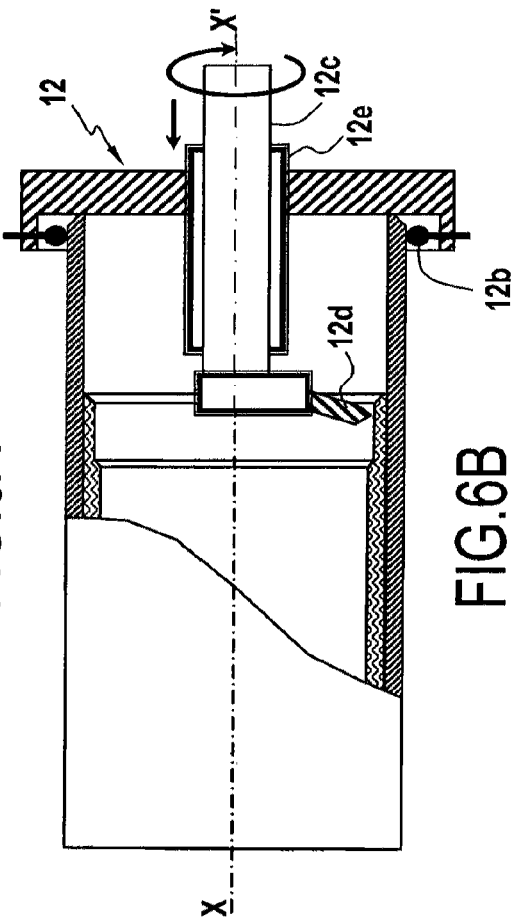

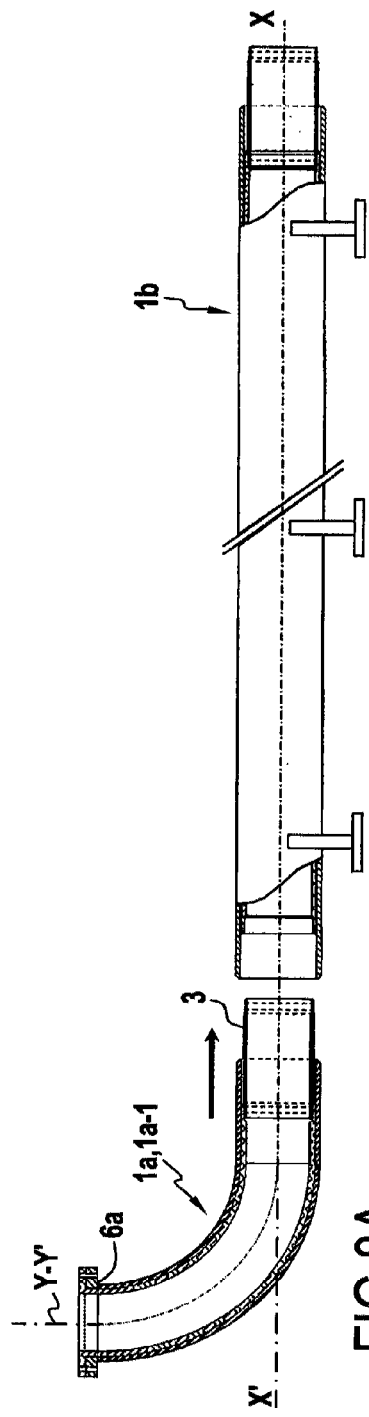
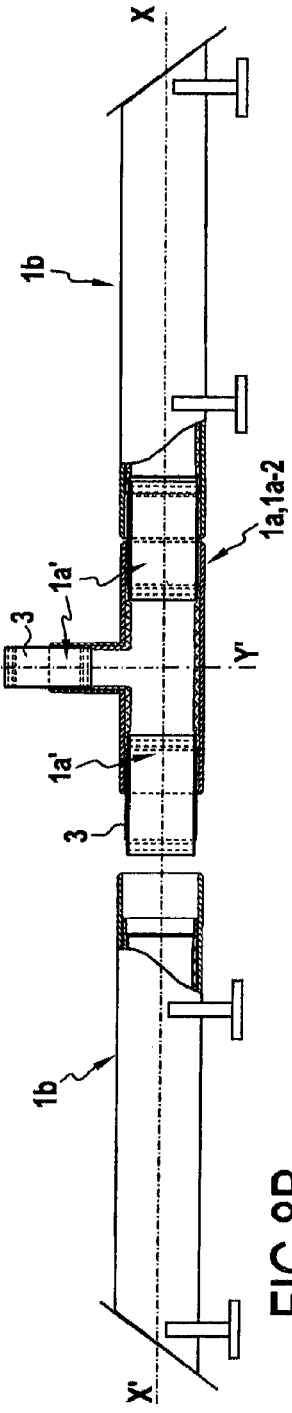
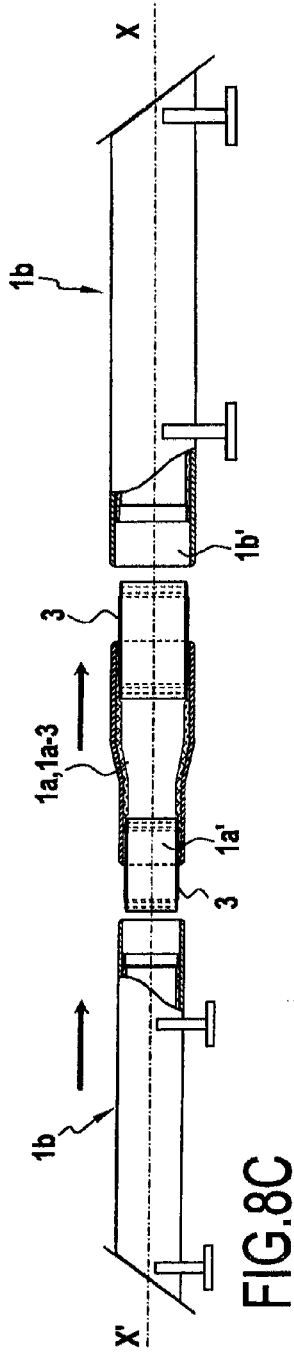
FIG.8A
FIG.8B
FIG.8C

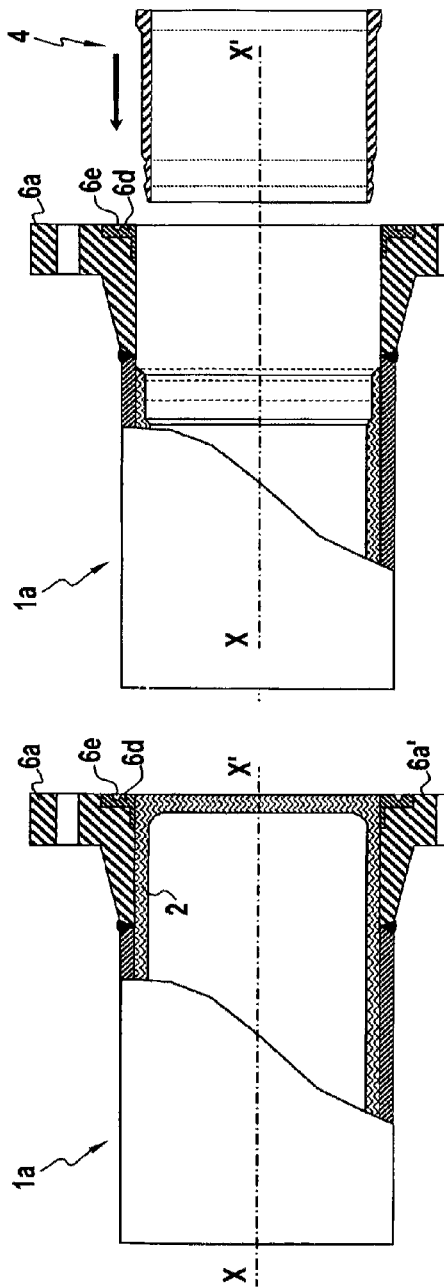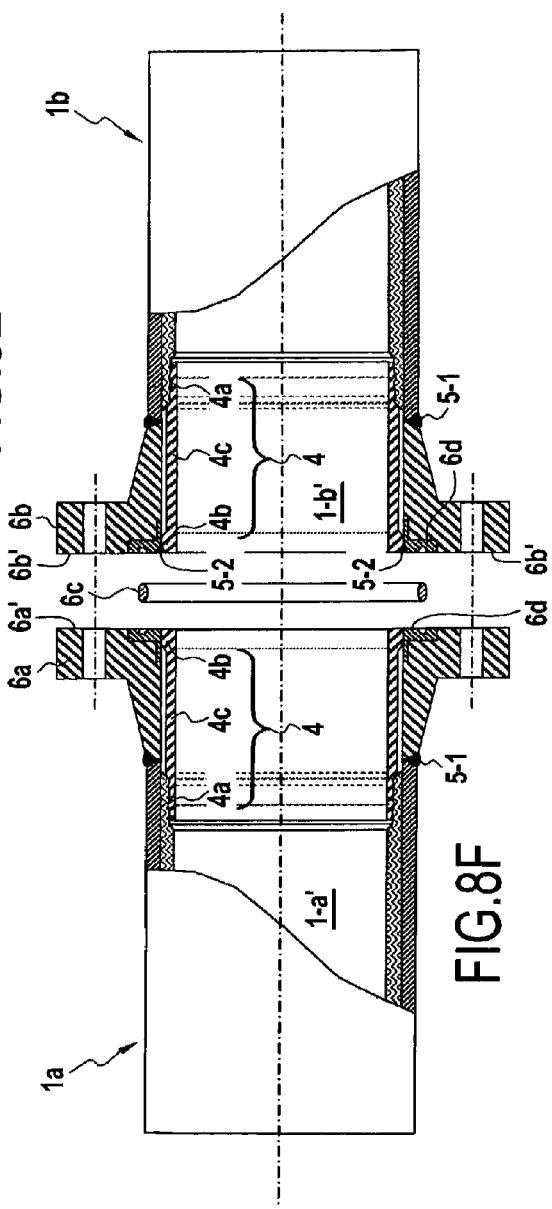

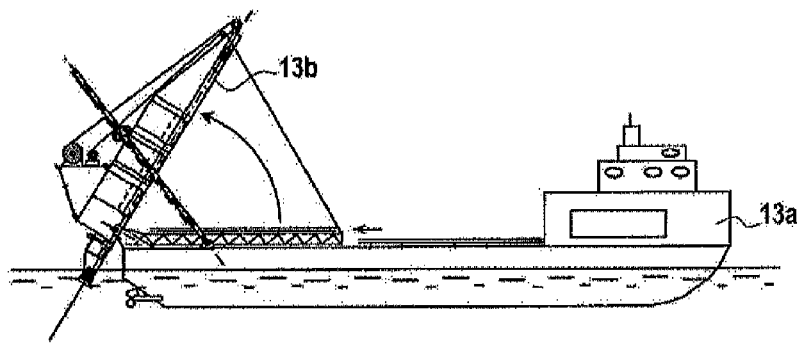
FIG.9A
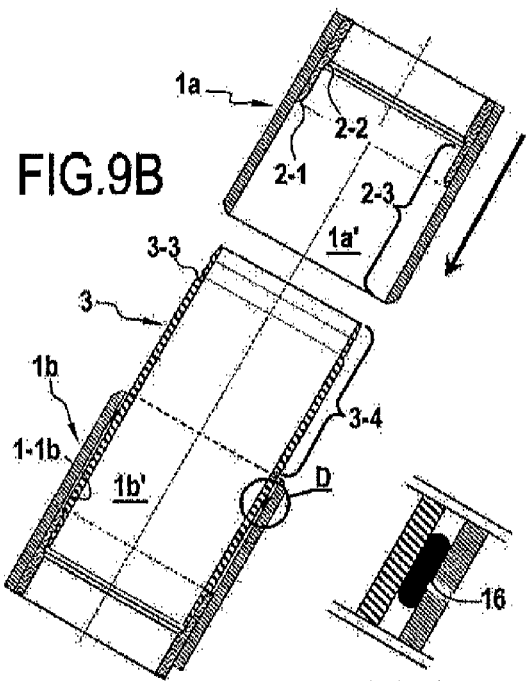
FIG.9B
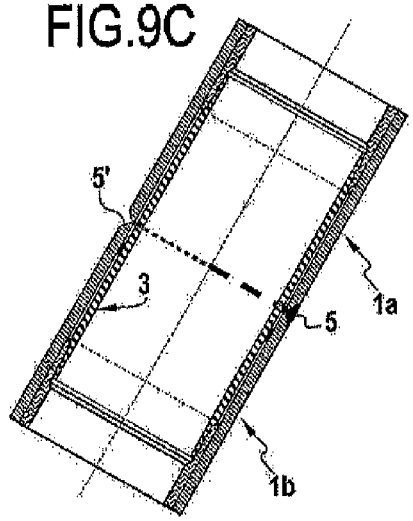
FIG.9C
FIG.9D

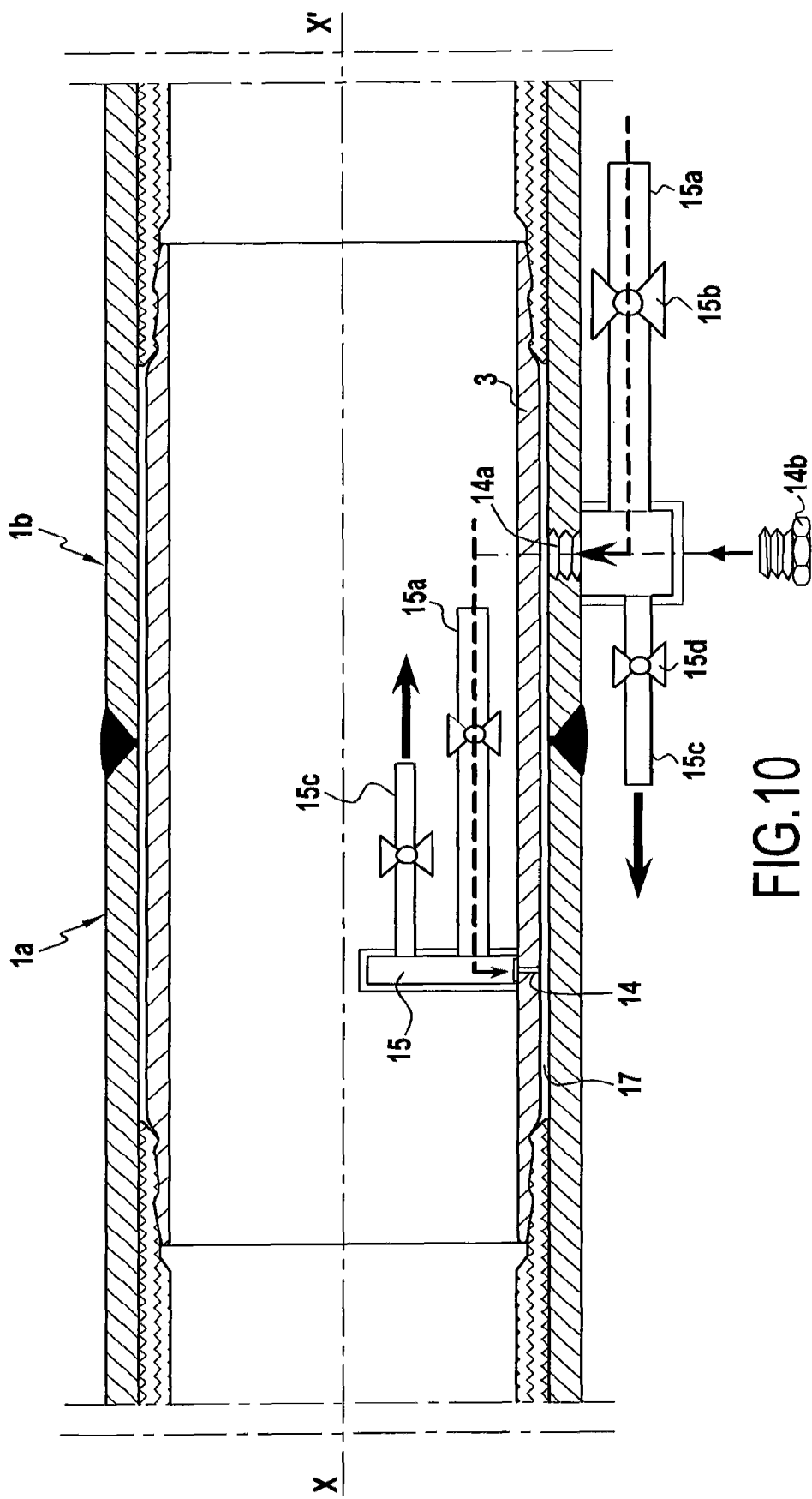

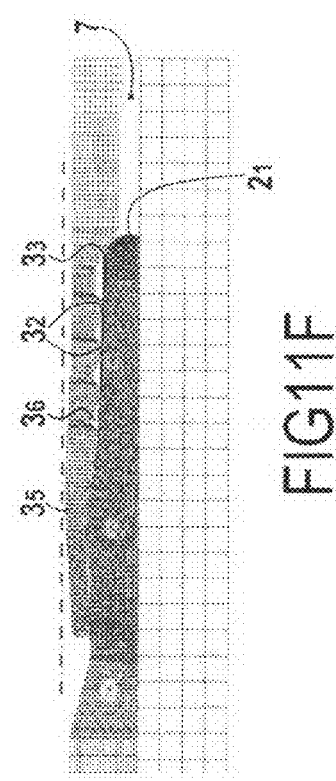
FIG.11E
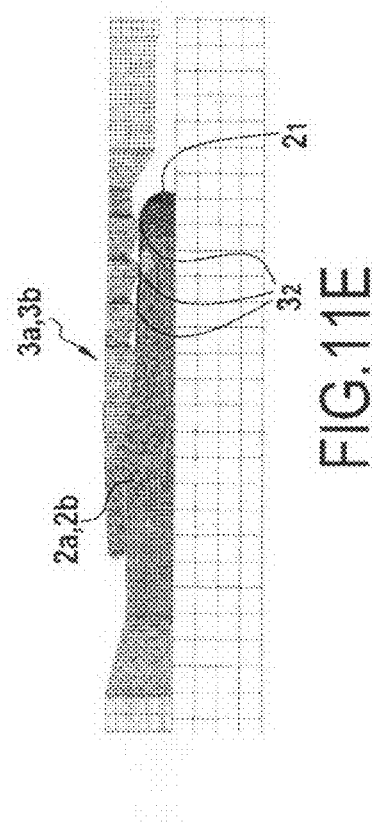
FIG.11F
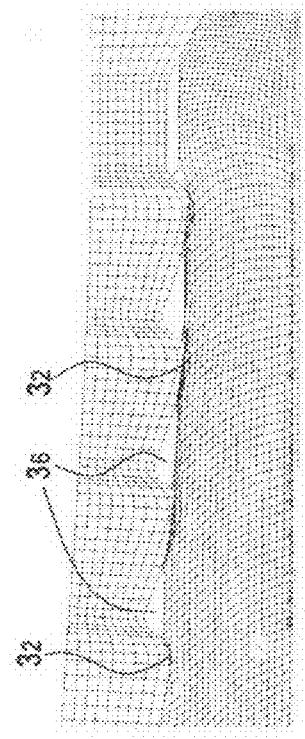
FIG.12A
FIG.12B

METHOD OF COVERING INSIDE SURFACE OF STEEL CONNECTION PART

PRIORITY CLAIM

This is a U.S. national stage of application No. PCT/FR2006/001354, filed on Jun. 15, 2006. Priority is claimed on the following application(s): Country: France, Application No.: 05/07153, Filed: Jul. 5, 2005, the content of which is incorporated here by reference.

BACKGROUND OF THE INVENTION

The present invention relates to the field of pipes for conveying fluids, in particular corrosive fluids, on land or at sea, and more particularly undersea pipes specifically for conveying sea water, and it also relates to pipe connection parts including an internal liner.

More particularly, the invention relates to connecting together two unitary pipe elements having respective internal linings, and still more particularly to elements having a length of 24 meters (m) to 48 m installed on oil fields in deep water, e.g. at depths in the range 2000 m to 3000 m, or even more, from a laying ship fitted with J-lay towers, with the help of a connection part that is not entirely cylindrical, being an element of the pipe bend type, of the T-branch connection type, or indeed of the tapering sleeve type.

More particularly, the present invention relates to a method of covering the inside surface of a steel connection part having an empty inside volume defined by said inside surface, the covering comprising a liner constituted by a layer of substantially uniform thickness of a thermoplastic material, said connection part having at least two open tubular ends suitable for being connected respectively to at least two steel pipe elements that are preferably lined in the same internal.

For a long time, rehabilitating water, gas, and drainage networks has made use of technologies that avoid trenching, i.e. technologies that consist in inserting a tubular liner inside an existing pipe, the liner generally being made of a flexible material such as thermoplastic or thermosetting materials or composite thermosetting materials, said liners either being inserted after being folded up along a longitudinal generator line so as to form a kidney-shaped cross-section and then rounded out merely by raising internal pressure, or else being inserted after being stretched by being put under traction so that the diameter of said sleeve is reduced to a value that is smaller than the inside diameter of said pipe. Under such circumstances, after being put into place, the tension on the liner is released and said liner then returns to its initial diameter and naturally presses against the inside face of said pipe. That mode of insertion is known under the term "swagelining" and it is commonly used for rehabilitating water or gas pipes over unit distances that may be as long as 500 m, or even 1 kilometer (km) in a straight line.

That technology is also implemented when transporting corrosive fluids under high pressure, thus making it possible to use a conventional pressure-withstanding pipe made of carbon steel, that is therefore inexpensive and easy to connect by welding, with the ability to withstand corrosion being provided by the internal liner. This makes it possible to produce unit lengths that may be several hundreds of meters long that need to be connected together while ensuring continuity of the protection against corrosion. Three types of connection are in common use: connection by flanges, by a screw joint, or by a welded joint. When connection is by flanges, it suffices to fold out the liner over the face of the flange, with the flanges, once clamped together, then pinching the liners face to face, and thus providing continuity in the anti-corrosion function. With screw joints, continuity may be provided for example by a ring provided with gaskets that provide sealing relative to each of the upstream and downstream liners. With welded joints, it is appropriate to terminate the liner at a significant distance from the end of the pipe, e.g. lying in the range 100 millimeters (mm) to 200 mm, so that the heating of the steel wall during welding does not damage said liner. The problem that then arises is providing protection against corrosion in the non-lined zone that extends between the end of the liner in pipe N and the end of the liner in the following pipe N+1.

Patent GB-2 218 488 describes the so-called "swagelining" method that consists in stretching a circular pipe of flexible material, referred to below as a "liner", so as to reduce its diameter to enable it to be inserted in a pipe by being pulled through, with the diameter of said liner at rest being greater than the inside diameter of said pipe. Another way of inserting such a liner is to deform it by folding it so as to obtain a kidney-shaped cross-section that can be inscribed within a circle of diameter that is much smaller thus making insertion possible merely by pulling the folded liner through the steel pipe. Once pulled through, the ends project considerably and naturally return to a substantially circular shape, and it is simple to fit a plug thereto. By pressurizing its inside with compressed air, the liner is caused to return to its circular shape, and it then presses firmly against the inside wall of the steel pipe.

The following patents GB-2 391 547, GB-2 298 256, WO-2004/015321, and WO-2004/011840 describe assembling together two pipe elements with the help of a tubular junction sleeve inserted into non-lined ends of the steel walls of two pipe elements that are to be assembled together, said tubular junction sleeve being made of a material that withstands corrosion.

Non-published application FR 04/11055 (2876773) in the name of the Applicant describes a method of fitting an internal liner to tubular pipe by threading it through, and a method of welding together pipe elements lined in that way, which methods are both mechanically reliable and also simpler and less expensive to perform, in particular when assembly is performed on site from a ship at sea, on pipe elements of length that is short and suitable for being laid from a ship at sea. Such methods and devices for lining and assembling pipe elements require some minimum number of parts for connecting the non-lined ends of the pipe elements for assembly, and they do not require special tools such as crimping tools to be used while assembling together two lined pipe elements. Those methods and devices for lining and assembling pipe elements are designed to make pipes that are suitable for being laid in great depth, and more particularly pipes that are suitable for injecting water, and more specifically for injecting sea water.

The lining methods described in the state of the prior art are not suitable for internally lining a connection part of inside volume that is defined by a surface that is not cylindrical, i.e. a surface that is not constituted by a single cylinder. When it is desired to continue a pipe with a major change in direction, whether to go from the sea bed towards the surface via a connection part constituted by an element in the form of a pipe bend, or to make a branch connection to another pipe with a connection part constituted by an element in the form of a T-branch connection, it is necessary to make use of connection parts that have inside surfaces that are not constituted by a single cylinder only. Similarly, when it is desired to assemble pipe elements having different inside diameters, it is necessary to make use of sleeves of tapering diameter, presenting an inside diameter at one end that corresponds to the diameter of one of the pipe elements, and an inside diameter at the other end that corresponds to the diameter of the other pipe. For such parts having inside surfaces that are not formed essentially by a single cylinder, methods of lining by threading a liner through are unsuitable.

JP 58 067383 describes a method of lining walls of a non-cylindrical inside volume in a junction part having open tubular orifices, in which a hot-melt resin is inserted into said part before said orifices are closed. Said part is then subjected to rotation in multiple directions at high speed while being heated.

In that method, the hot-melt type resin has strong bonding properties on the wall and it is the centrifugal force generated by the rotation that serves to spread the resin over the entire combined inside surface of the part, with heating encouraging bonding of the resin on the surface of the wall. However, that method does not make it possible to obtain a distribution of genuinely uniform thickness over the entire wall of the inside volume of the part, since centrifugal force is necessarily of varying strength, given that it varies with the square of the distance between the place where it is exerted and the axis of rotation of the part, and this applies even when multidirectional rotation is provided.

SUMMARY OF THE INVENTION

The object of the present invention is to provide an improved method that is suitable for internally lining such connection parts having an inside surface that is not cylindrical.

Another object of the present invention is to provide methods of assembling connection parts lined in this way with lined pipe elements, which methods are suitable for the various conditions under which said connection parts are implemented, regardless of whether they are for pipes that are to be used under low-pressure conditions such as the pipes used in civil engineering on land, in particular for public works, or at sea in shallow water; or on the contrary whether they are for pipes that are used under high-pressure conditions, in particular pressures of more than 30 bars (3 MPa), and more particularly at sea in waters of great depth.

For this purpose, the present invention provides a method of covering the inside surface of a steel connection part having an empty inside volume defined by said inside surface, with a liner constituted by a layer of substantially uniform thickness of a thermoplastic material, said connection part having at least two open tubular ends suitable for connecting respectively to at least two steel pipe elements having the same internal liners, the method being characterized in that the following steps are performed:

a) closing said open ends of said connection part with covers, at least one of said covers presenting a filler orifice with an isolation valve suitable for enabling granules of a said thermoplastic material to be introduced into said inside volume, and preferably also a ventilation or purge orifice with an isolation valve, and all other openings, if any, in said part are plugged; and b) introducing said granules of said thermoplastic material into said inside volume through a said filler orifice, in an amount that is necessary and sufficient for obtaining a layer of said thermoplastic material over all of said inside surface with a substantially uniform desired thickness; and c) heating the walls of said connection part defining said inside volume to a temperature enabling said granules to be melted; and d) causing said connection part to turn simultaneously about at least two different axes of rotation for a length of time that is sufficient and at a speed that is sufficiently low to enable said thermoplastic material to melt on said inside surface and to be distributed in substantially uniform manner over all of said inside surface; and e) cooling said connection part or allowing it to cool prior to removing said covers, while maintaining said rotation.

In the present invention, the part is thus rotated at a speed that is sufficiently slow to ensure that the granules always remain in the bottom of said inside volume until they have melted and bonded to the wall. It is by prolonged contact with a certain zone of said inside surface of the wall over a sufficient period of time that a certain quantity of said material can, at the beginning of the process, melt and bond to the wall to form a thin film. Then, on the next rotation, a certain quantity of said material bonds to said melted film and melts in turn, thereby building up the thickness of the layer little by little as rotation of the part continues, until all of the granules have been used up. The thickness of the layer can thus be controlled by controlling the transfer of heat between the heater device and the wall, and also between the wall and the material inside the part. Heat transfer can be controlled by the heating temperature, by the cycle of tumble rotation of the part (speed and path about multiple axes), and also by the thermal mass of the metal part, which can advantageously be adjusted, where appropriate, with the help of localized shields that reduce heat transfer.

Thus, the method of the invention makes it possible to obtain a liner of thickness that is genuinely uniform over the entire combined inside surface of the part.

While said part is being heated, the pressure of the gas contained in said inside volume increases, thereby contributing to keeping said molten material pressed against said inside surface.

However in order to avoid or reduce the risk of the internal liner of said material coming unstuck, in particular when a thermoplastic material is used that presents a high degree of shrinkage, such as high density polyethylene (HDPE), it is preferable to maintain the pressure inside said inside volume, thus having the effect of pressing the liner strongly against the wall of the part throughout the cooling stage, thereby avoiding shrinkage of said sleeve relative to the inside wall of said part.

In a preferred implementation, the pressure inside said volume is increased prior to cooling by pressurizing said inside volume with the help of a gas, preferably an inert gas such as nitrogen, or with water under pressure, introduced via said ventilation or purge orifice, and said greater internal pressure is maintained during cooling, preferably at a value of not less than 10 bars ($10^6$ pascals (Pa)).

This high internal pressure thus also serves, where appropriate, to eliminate microbubbles of gas trapped in the thickness of the liner while still in a pasty state.

When maintaining a high internal pressure, it is preferable to use said covers that present a dome shape and that are preferably welded to said ends of said connection part. The curved shape of the cover wall is better at withstanding high pressures inside said internal volume, and this avoids any need to use gaskets, given that gaskets are very difficult and expensive to implement at the high pressures associated with the high temperatures that are required by the method.

If materials are used that present little shrinkage such as low density polyethylene, it is possible to work at atmospheric pressure. This type of liner is suitable for pipes that are used for conveying fluids in conventional networks, in particular urban water or gas networks. Under such circumstances, the connection between said connection part and said pipe elements can be provided with the help of conventional connecting flanges.

According to more particular characteristics of the covering method of the invention:
- in step c), said walls are heated by placing said part in a heater device such as an oven, or a gas burner strip, thus enabling all of the zones of said part to be heated uniformly; and
- in step d), said connection part is caused to rotate with the help of a multidirectional rotation device for rotary molding, with rotation about each of said axes of rotation preferably being controlled by means of a computer.

Rotary molding methods and machines are known, in particular such as those described in U.S. Pat. No. 3,600,754, or other similar systems that are used inside an oven.

More particularly, the granules of thermoplastic material are granules of thermoformable polymers selected from polyethylene, polypropylene, polyamide, polyvinyl, in particular polyvinylchloride (PVC), polyvinylidenefluoride (PVDF), polytetrafluoroethylene (PTFE), polyether-etherketone (PEEK), and all other thermoformable polymers.

These polymers present melting temperatures in the range 160° C. to 360° C.

For these polymers, the connection part is heated to a temperature that is 20° C. to 40° C. higher than the melting temperature of said polymer, without excessively exceeding said values in order to avoid damaging the molecules, since that would have the effect of degrading the mechanical performance of the resulting liner. Preferably, the inside volume of the part is maintained under an atmosphere of inert gas, such as nitrogen, whether it is at ambient pressure or at high pressure.

In a preferred implementation of a covering method of the invention:
- a first said covering is made to obtain a said liner comprising a first layer of a first thermoplastic material; and
- a second covering is made to obtain a second layer of a second thermoplastic material different from said first material, said second thermoplastic material being contained in a different reservoir and being introduced into said connection part via a said cover once said first material has melted completely and has bonded to said walls, said second material covering said first material and being melted to obtain the desired final thickness.

As mentioned above, said connection part may have a variety of shapes and functions, and in particular, depending on the following particular embodiments, in which:
- said connection part is a bend pipe element suitable for enabling two pipe elements that extend in different directions to be connected together by being connected to respective ends of said bend element constituting said connection part; or
- said connection part is a T- or crossed-shaped element suitable for enabling three or four or even more pipe elements to be connected to its respective ends, the elements extending in at least two directions making between them an angle lying in the range 0 to 90°, and preferably of 90°; or
- said connection part is a tapering tubular sleeve presenting two tubular ends of circular cross-sections that are of different inside diameters, suitable for enabling two pipe elements of diameters corresponding respectively to the inside diameters of the two tubular ends of said tapering tubular sleeve to be connected thereto.

The method of the invention is more particularly advantageous and necessary for lining a connection part of inside surface that is not cylindrical. Under such circumstances, traditional methods of lining by threading through cannot be implemented validly.

The term "non-cylindrical" is used herein to mean a surface that is not entirely cylindrical, it nevertheless being possible for said inside surface to have one or more portions that are cylindrical, but the surface itself is not formed essentially by a single cylinder.

In an advantageous implementation, during the cooling step, said inside volume is pressurized with water at high temperature that is cooled by being caused to flow through a heat exchanger, enabling it to lose heat, while maintaining the desired level of pressure until all of said connection part and said thermoplastic material applied as a layer thereon is completely cooled.

The thickness of the layer of thermoplastic material results from the transfer of heat between the hot atmosphere of the oven and the wall of said inside volume of the connection part. If a large amount of heat is transferred, then said layer of thermoplastic material will have a large thickness, if only a small amount of heat is transferred, then said layer of thermoplastic material will not have sufficient thickness.

In order to ensure that thickness is uniform over the entire surface of said connection part, heat transfer between the heater device and the inside of the part is adjusted, advantageously by thermally insulating localized zones of the wall of said connection part that present a greater rate of heat transfer, e.g. the connection zone between the part and its flange or its end plug. For this purpose, a thermally insulating material is advantageously applied locally on the outside surface of said wall to act as a shield.

In a particular implementation, said connection part comprises, at least one of its tubular ends, a first connecting flange suitable for co-operating with a second connecting flange of a said pipe element for connection to said connection part, and the covering is made continuously over the entire combined inside surface of the connection part and over said connecting flange with a layer of said thermoplastic material, after said first flange has been fastened by welding to the end of said connection part and the open end of said first flange has been closed with a said cover.

Implementing a connecting flange facilitates the final step of connecting the connection part with a pipe element in situ on the laying site, in particular on the sea bottom as explained below.

Advantageously, a said cover is used presenting a shape and means for fastening to said flange that enable the covering comprising a layer of thermoplastic material to be made continuously over the entire combined inside surface of the connection part and of said first connecting flange, and also over the external bearing face whereby said first flange bears against said second flange.

The present invention thus also provides a connection part having an empty inside volume defined by an inside surface coated with the liner of substantially uniform thickness obtained by a liner covering method of the invention.

More particularly, the present invention provides a connection part having its said inside surface in the form of a surface that is not cylindrical.

A connection part of the invention may include at least one of its ends a said first connecting flange to which it is welded.

In an advantageous embodiment of a connection part of the invention for assembly to a pipe element or to a connecting flange via a tubular junction sleeve at least one of its said open tubular ends, said liner includes an end portion of thickness that is reduced relative to the thickness of the remainder of said liner, which end portion is obtained by machining and thus defines an inside surface of revolution of inside diameter greater than the inside diameter of the remainder of said internal liner and terminating at a certain distance from the end of said connection part. After being machined, the end of said connection part is thus no longer lined.

This makes it possible to insert a tubular sleeve by force as described below and in accordance with patent application FR 04/11055.

The present invention also provides a method of assembling a pipe in which a connection part of the invention is assembled with a said pipe element.

In a first variant of the connection method of the invention, more suitable in particular for connecting pipes that are to be used under conditions of pressure inside the pipe that is less than 30 bars (3 megapascals (MPa)):

said connection part includes a said first connecting flange to which it is welded, with the entire combined inside surface of the connection part and of said first connecting flange, and also the external bearing face of said first flange for bearing against said second flange are covered in a said continuous layer of thermoplastic material; and said pipe element includes at its end a said second connecting flange to which it is welded, the entire combined inside surface of said pipe element and of said second connecting flange, and also the external bearing face of said second flange for bearing against said first flange are covered in a said continuous layer of thermoplastic material; and said first and second connecting flanges are connected together, preferably against an interposed gasket.

In this first variant of the assembly method, there is no need to use a tubular junction sleeve for assembling said junction part with a said pipe element.

In a second variant implementation of the assembly method of the invention, that is more suitable in particular for connecting pipes that are to be used under conditions of pressure inside the pipe greater than 30 bars (3 MPa), a tubular junction sleeve is used and said junction sleeve is inserted into the open tubular end of said connection part via one end of said sleeve, which sleeve presents substantially the same inside diameter as said internal liner of said connection part.

In a first implementation of this second variant of the assembly method of the invention, suitable for making the connection on the surface, in particular on board a laying ship:

the junction sleeve is inserted:
via one end of said sleeve into the inside of the open tubular end of said connection part, which end does not have a connecting flange; and
via the other end of said sleeve into the inside of the corresponding end of said pipe element, which end does not have a said connecting flange; and
the ends of said connection part and of said pipe element are moved towards each other and welded together over said junction sleeve.

More particularly, in this first implementation of the second variant, the following steps are performed:

a) said connection part, said pipe element, and said tubular junction sleeve are prepared in such a manner that:
each of the internal liners of thermoplastic material at the open ends of said connection part and of said pipe element includes an end portion of thickness that is reduced relative to the thickness of the remainder of said liner; and
said sleeve presents at each of its ends an end portion of thickness that is reduced relative to the thickness of the central portion of said sleeve, said end portion of the sleeve defining an outside surface of revolution of outside diameter less than the inside diameter of the non-lined ends of said connection part and of said pipe, said sleeve presenting substantially the same inside diameter as said internal liner of the main portions of the connection parts and of said pipe element; and b) said tubular junction sleeve is inserted into said open tubular ends of reduced thickness of the liner of said connection part and of said pipe element so as to overlap said reduced-thickness end portions of liner.

In a second implementation of this second variant of the assembly method of the invention, suitable for being implemented at the bottom of the sea, and in particular at great depth, the following steps are performed:

a) initially the following are prepared:
a said connection part including a said first connecting flange to which it is welded, with the entire combined inside surface of the connection part and of said first connecting flange being covered in a said layer of thermoplastic material; and
a said pipe element having at its end a said second connecting flange to which it is welded, the entire combined inside surface of said pipe element and of said second connecting flange being covered in a said layer of thermoplastic material; and b) machining the internal liners of thermoplastic material at the ends of said connection part having a said first flange and of said pipe element having a said second flange in such a manner as to create in each of said internal liners an end portion of thickness that is reduced relative to the thickness of the remainder of said liner, and terminating at a certain distance from said ends of said connection part and of said pipe element respectively such that the inside surfaces of said first and second flanges are not lined; and c) inserting at each of the open ends of said first and second flanges tubular junction half-sleeves for reinforcing the junctions between said connection part and said first flange and between said pipe element and said second flange, each said half-sleeve presenting:
at its front end, a front end portion of tubular wall of thickness that is reduced relative to the central portion of the tubular wall of said half-sleeves; and
at its rear end, a rear end portion of tubular wall of thickness greater than the thickness of the central portion of said half-sleeve; and
each half-sleeve being inserted in such a manner that said front end portions of reduced wall thickness of said half-sleeves overlap said end portions of reduced thickness of said liners of said connection part and of said pipe elements respectively; and d) welding said half-sleeves to said first and second flanges respectively at said rear ends of said half-sleeves and external bearing faces of said first and second flanges, respectively; and e) moving together and fastening to each other said first and second connection flanges, preferably with a toroidal gasket being interposed between them, more preferably a gasket that provides metal-on-metal sealing.

In this method, steps a) to d) can be implemented on the surface in a fabrication site, where appropriate on board a pipe-laying ship, however step e) should be performed in situ on the laying site, in particular at great depth.

Advantageously, said tubular junction sleeves or where appropriate said tubular junction half-sleeves are made of a material that withstands corrosion, preferably of the stainless steel or Inconel alloy type, with the connecting flanges also having zones of corrosion-withstanding material, preferably of the stainless steel type or of the Inconel alloy type.

Preferably, the outside surfaces of said end portions of reduced thickness of said sleeves, or where appropriate of said half-sleeves, are notched surfaces, preferably having a substantially tapering chamfered end enabling insertion and anchoring against the inside surfaces of the end portions of reduced thickness of the corresponding liners, thus providing a mechanical connection between said outside surfaces of said sleeves or half-sleeves and the inside surfaces of said liners of reduced thickness, merely by forced-engagement of said sleeve, or where appropriate said half-sleeve, in the axial longitudinal direction into said open ends respectively of said connection part, of said pipe element, or where appropriate of said first and second flanges, respectively.

The terms "internal/external", "inside/outside", or "inner/outer" are used relative to the inside/outside of the connection part, the pipe, the sleeve, or the half-sleeve, as appropriate.

The inside surface of each of the liner end portions is substantially cylindrical and is subjected to creep on said sleeve being inserted by force, and also on elastic deformation of its notched outside surface by pressure from the notched outside surface of the sleeve against said inside surface of the liner.

More particularly, the present invention provides a connection part and a pipe suitable for being laid at great depths in the sea, preferably depths of as much as 3000 m, and said pipe elements present a length lying in the range 20 m to 50 m.

More particularly, the pipe is for injecting water, in particular sea water, or even non- . . . sea water.

In an implementation, a said cross-linkable material or a said gel is injected through a hole previously drilled through the wall of said sleeve or said steel wall of the pipe or of the connection part and via a vacuum chamber fitted in register with said hole, after evacuating said annular chamber, and then said vacuum chamber is removed and said hole is plugged.

BRIEF DESCRIPTION OF THE DRAWINGS

Other characteristics and advantages of the present invention appear in the light of the following detailed description with reference to the following figures, in which:

FIG. 1 is a side view in section of a connection part of the lined bend type fitted at its bottom portion with a first connection flange facing the end of a pipe element that is fitted with a second connection flange;

FIGS. 1A and 1B are sections on planes AA and BB in FIG. 1;

FIG. 2 is a perspective view showing the principle of rotary lining;

FIG. 3 is a side view in section of a bend 1a-1 fitted with a first flange 6a during the final stage of rotary lining;

FIG. 4 is a variant of FIG. 3 in which the rotary lining is performed under high pressure;

FIGS. 6A and 6B are side views in section showing the end of a lined connection part at the end of the rotary lining process, respectively before (FIG. 6A) and during (FIG. 6b) machining of said liner;

FIG. 7 shows the detail of the notched surface 3-2 at the end of the tubular junction sleeve 3;

FIG. 8A is a side view in section of a connection part of the lined bend type 1a-1 fitted with a junction sleeve 3 at its right-hand end ready for being assembled by insertion with a unit length of pipe 1b;

FIGS. 8A to 8C are side views in section of a connection part of (FIG. 8A), of the T type (FIG. 8B), and of the shrink sleeve type (FIG. 8C) fitted with a junction sleeve at its end after being assembled by insertion with a unit length of pipe;

FIGS. 8D and 8E are side views in section of the tubular end of a connection part fitted with a first connecting flange before (FIG. 8D) and after (FIG. 8E) machining the end of its internal liner;

FIG. 8F shows the end of a said connection part fitted with a first connecting flange facing the end of a pipe element fitted with a second connecting flange and having inserted therein two tubular junction half-sleeves;

FIG. 9A is a side view of an installation ship fitted with a so-called J-lay tower;

FIGS. 9B and 9C are side views in section showing stages of assembling tubular ends of a connection part with a lined pipe element, respectively during an approach stage (FIG. 9B) and a welding stage (FIG. 9C);

FIG. 9D is a section relating to FIG. 9B showing in detail how the centering spacers are positioned close to the welding zone;

FIG. 10 is a section showing the connection of the tubular junction sleeve and the liner, showing in detail how a fluid is injected into the annular chamber extending between said sleeve, the ends of the liners, and the wall of the steel pipe, whether from the outside or from the inside;

FIGS. 11A to 11F are diagrams resulting from finite-element calculations showing in detail six stages of inserting a sleeve or a half-sleeve and showing how their notched surfaces deform and how the flexible material constituting the liner is subjected to creep;

FIG. 12A is a result of finite-element calculation showing details of how the sleeve and half-sleeve with a notched surface deform and how the sleeve deforms plastically when the pipe is subjected to an internal pressure, the chamber extending between said sleeve, the ends of the liners, and the steel pipe remaining substantially at atmospheric pressure; and FIG. 12B shows a detail of the notched outside surface of the sleeve corresponding to FIG. 12A.

DETAILED DESCRIPTION OF THE PRESENTLY PREFERRED EMBODIMENTS

Figure 5:
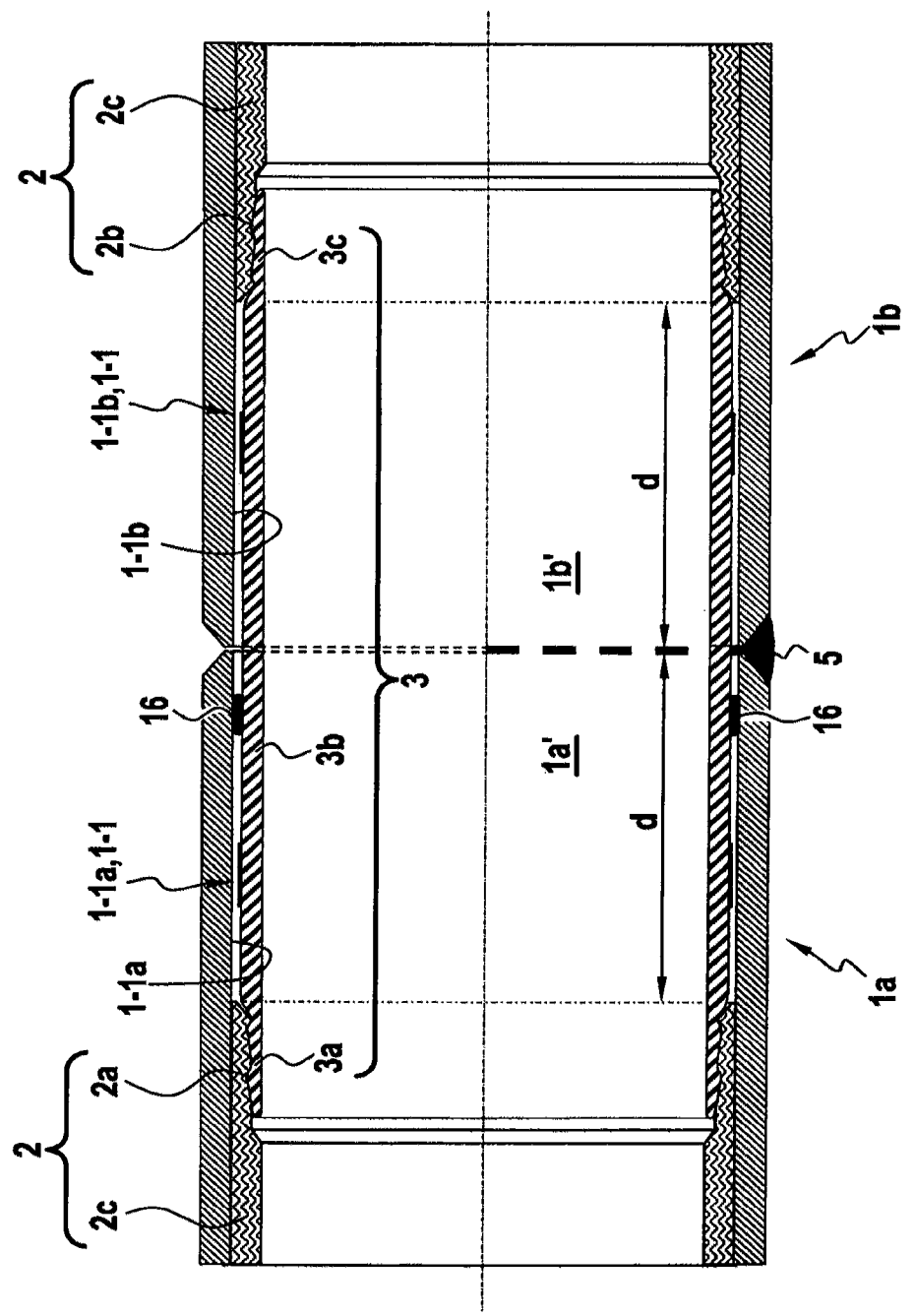
FIG. 5 is a side view in section showing a connection part 1a of the invention assembled to a pipe 1b with the help of a tubular junction sleeve.
Figure 11A:
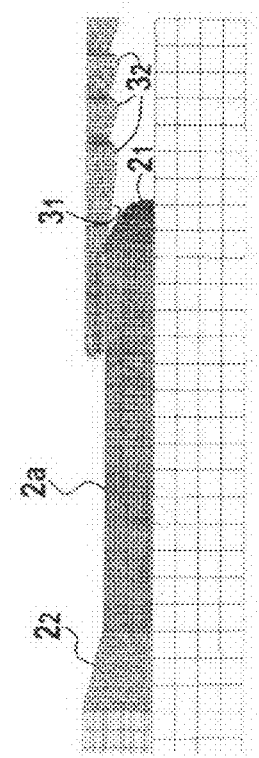
Figure 11B:
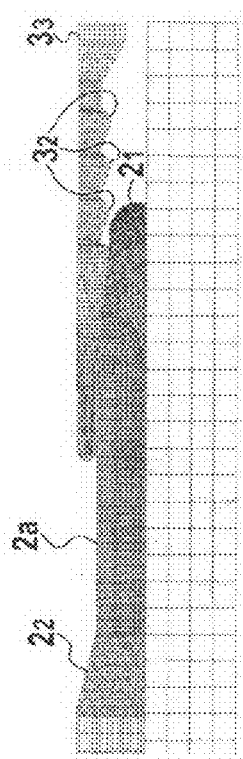
Figure 11C:
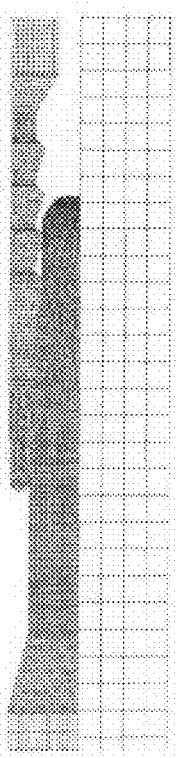
Figure 11D:
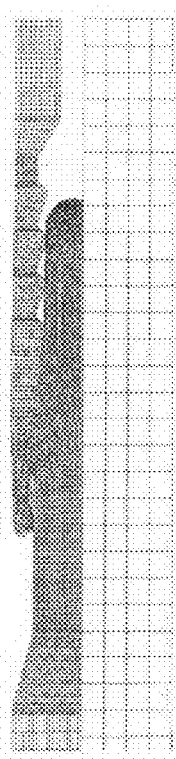

FIG. 1 shows a connection part 1a-1 of the invention of the bend type having a liner 2, the part having a top open tubular end 1a' for connection by welding to a lined rectilinear pipe element 1b, and a bottom open tubular end 1a' having a first flange 6a welded 5-1 thereto, said liner 2 extending continuously over the outside bearing face 6a' to the periphery of said flange 6a. Said first flange 6a is for fastening to a second connecting flange 6b at the end of a pipe element 1b with a gasket 6c therebetween. FIGS. 1A and 1B are sections respectively seen from above and from the side on respective planes AA and BB. The steel bend is constituted by a curved portion of radius R extended upwards by a straight portion of length L1 of diameter substantially equal to that of the curved portion. The liner is of thickness that is substantially constant over all of the inside surface of the connection part, including the surface of said flange.

With steel pipes of large thickness, the curved portion is generally obtained by localized induction heating up to a temperature lying in the range 800° C. to 900° C., associated with mechanical bending to the desired radius of curvature. This process generally requires there to be a straight portion of pipe at each of the ends so that the assembly can be held in the induction bending machine. Another method that is used on smaller thicknesses consists in welding a straight portion onto a bend of given angle that is curved to the desired radius.

FIG. 2 is a perspective view showing the principle of lining by rotary molding, known to the person skilled in the art, and consisting in causing a forming mold to rotate in three dimensions, generally in pseudo random manner about two axes 8*a*, 8*b* that are generally mutually perpendicular, with granules of a thermoplastic material such as polyethylene, polypropylene, polyamide, or indeed PVDF or PEEK, being introduced into the mold and then heated progressively, preferably in an oven, up to a temperature at which the granules reach their melting temperature, and preferably a temperature that is 20° C. to 40° C. above said melting temperature. The molten granules then stick to the wall of the mold, and since the mold is set into pseudo random rotation about two axes, the thickness of the plastic increases in substantially uniform manner over the entire combined inside surface of the mold. Once all of the granules have melted, rotation is continued and then the outside wall of the connection part acting as a mold is cooled either in the open air or in a flow of air, or indeed having water splashed thereon. When the mold is cold, it is opened and the rotary molded part is removed therefrom, with unmolding generally taking place without difficulty since the thermoplastic material shrinks by about 1% to 3%, depending on the material.

For an internal liner of a connection part of the invention, such as bend or a T, the connection part acts as a lost mold and the liner 2 remains therein. Furthermore, it is desired to minimize or eliminate shrinkage so that the thermoplastic material is in intimate contact with the inside surface 1-1 of said connection part, and it is desired to improve the bonding of said liner on said pipe. Thus, the accessory itself acts as a "lost mold" since the liner stays in place permanently, whereas in the prior art, the mold used to be opened and the finished part extracted from said mold.

In the preferred version of the invention as shown in FIG. 3, the steel bend 1*a*-1 that is terminated upwards by a straight portion and downwards by a first flange, is provided with a cover 1-3 at each of its ends 1*a*' so as to seal the inside volume 1-2 of the bend. In the top portion, a filler orifice 1-4 is installed that includes an isolation valve, and a ventilation orifice 1-5 is also installed, for a purpose that is explained in greater detail below. The granules 2-1 are introduced via said filler orifice 1-4, as shown in the top portion of the figure to the left of section CC, and then the entire assembly is secured in a rotation machine 8 having two axes 8*a*, 8*b*. The assembly is then heated and rotated slowly until the granules 2-1 that remain in the bottom portion of the inside volume of said part become fully melted and stuck to the zone of the wall that is in contact with said granules, as shown in the bottom left-hand portion of said section CC. When the closure covers 1-3 are put into place, care is taken to plug temporarily the bolt holes 6*a*-3 in the flange 6*a*. The pseudo random rotation of the part throughout the duration of the heating and cooling cycle makes it possible to cover the entire inside surface of said part both progressively and regularly. After the assembly has cooled, the covers 1-3 are removed and beside the flange, the thermoplastic material is cut at 6*a*-2 flush with the free face of the liner of said material, and holes corresponding to the holes 6*a*-1 in the flange are counterbored after removing the plugs 6*a*-3 closing said holes in said flange, as shown in FIG. 1.

In contrast, in FIG. 1, the top open tubular end 1*a*' of said connection part is for being machined, as shown in FIGS. 6A-6B that are described in greater detail below.

For clarity of the drawings, the thermoplastic layer is shown as having uniform thickness with connections at right angles, however in reality said layer presents thickness that is substantially constant and is clearly rounded over each corner, in particular in the vicinity of the face of the flange.

This method is particularly suitable for application to thermoplastic materials that shrink little, for example low density polyethylene (LDPE), thus making it possible to ensure substantially intimate contact between the thermoplastic liner and the tubular steel wall.

In a preferred version shown in FIG. 4 relating to a bend 1*a*-1 without an end flange, both ends of the pipe are initially closed with dome-shaped end walls 1-3 that are welded thereto 5-3, thus enabling the assembly to withstand internal pressure that is high or even considerable, and then the internal volume 1-2 is filled with the required quantity of granules 2-1, and finally heat is applied and the part is set into rotation. During heating, the pressure of the gas imprisoned therein increases because of the temperature. And at the end of the cycle, pressure is advantageously further increased via the purge orifice 1-5 so that the internal volume 1-2 is raised to a higher pressure, e.g. 15 bars or 20 bars, or even more, so as to keep the liner pressed firmly against the inside wall of the tubular pipe throughout the cooling stage and so as to resorb microbubbles of gas trapped in the thickness of the liner while in the pasty state prior to cooling. At the end of cooling, the pressure is released and the connection part is cut perpendicularly to its axis on plane DD at each of its ends 1*a*'. The liner 2 then remains intimately bonded with the steel wall of the inside surface 1-1 of said connection part, and any shrinkage is thus avoided. To improve bonding between said liner 2 and said inside surface 1-1, the inside of the pipe is advantageously sanded beforehand, thereby increasing the roughness of the surface and increasing the bonding of the thermoplastic resin.

This method is particularly applicable for thermoplastic materials presenting a high degree of shrinkage, such as high density polyethylene (HDPE), thus making it possible to guarantee intimate contact between the thermoplastic liner and the steel wall regardless of the thermoplastic material selected. To avoid using air or a gas under pressure, it is advantageous to pressurize the connection part with water at high temperature, which is advantageously cooled by making it circulate through a heat exchanger so as to enable it to lose heat while maintaining the desired level of pressure, until the assembly has cooled down completely.

The rotary lining machine has a main axis constituted by a horizontal shaft driven by a first motor and turning at a speed that is variable over the range 0 to 10 revolutions per minute (rpm), with a secondary axis installed at the end thereof and constituted by a second shaft that is generally perpendicular to the first and that is driven by a second motor rotating at a speed that is variable over the range 0 to 10 rpm. A structure secured to the second shaft supports the connection part. Said connection part is initially filled with granules of micronized granules of material, i.e. with particles having grain size that is generally less than 500 micrometers (µm) to 800 µm. The weight of powder is calculated very precisely from the inside area that is to be covered and from the thickness that is desired for the liner. The assembly is then placed in an oven, preferably a forced-air oven at a temperature of about 250° C. for polyethylene and about 300° C. for polypropylene, and rotation about both of said axes is maintained for a duration of 60 minutes (') to 200' in order to obtain a lining with a thickness 12 millimeters (mm) to 15 mm. The assembly is then extracted from the oven for the cooling stage during which rotation is maintained about both axes until the connection part is at ambient temperature. At the beginning of cooling, the internal cavity is advantageously raised to a high pressure, e.g. 15 bars to 30 bars, in order to keep the liner well pressed against the inside wall of said connection part. Cooling is advantageously accelerated by setting up a stream of cool air, or by watering the assembly from the outside, or indeed by combining a stream of air with watering. Cooling is also advantageously accelerated by causing cool air to flow inside the cavity of the liner, e.g. by the orifice 1-5, having taken care to ensure that there is a similar second orifice that is preferably situated at the opposite end of the connection part, so that hot air, and thus heat coming from the internal cavity, can be extracted via said second orifice.

On the basis of a few tests, the quantity of powder needed can be adjusted so as to obtain the desired thickness over the entire surface, and if there is any local extra thickness, correspondingly locally to excessive transfer of heat, said transfer of heat is advantageously reduced by placing insulating pads locally on the outside of said connection part.

By way of example, a connection element in the form of a bend corresponding to FIG. 3 and made out of pipe having an inside diameter of 30 centimeters (cm) having a straight length of 40 cm and a 90.degree. bend with an inside radius of curvature of 100 cm, fitted at its bottom end with a flange having a diameter of 40 cm, and plugged at both ends needs a volume of 32.6 liters (L) of compact resin, and thus a weight of 30.6 kilograms (kg) of HDPE presenting relative density of 0.94, in order to obtain an internal liner with a thickness of 15 mm. The heating cycle lasts for about 90 minutes with the oven at a temperature of 265° C. Cooling is performed under a stream of ambient air for a duration of 90 minutes to 120 minutes.

Similarly, a T-shaped connection element without flanges, constituted by a main pipe having an inside diameter of 30 cm and a length of 160 cm and closed at each end by a plug, with a branch with an inside diameter of 12 cm also closed by a plug, requires a volume of 25.8 L of compact resin, and thus a weight of 24.2 kg of HDPE with relative density of 0.94, to obtain an internal liner with a thickness of 15 mm. The parameters of the heating and cooling cycles are substantially similar to those of the connection part in the form of a bend.

Similarly, a reducing connection element having no flanges, constituted by a main pipe with an inside diameter of 30 cm and a length of 30 cm, a pipe of reduced diameter of 20 cm and length of 30 cm, and a transition zone with length of 30 cm, being closed at each end by a plug, requires a volume of 10.5 L of compact resin, and thus a weight of 9.8 kg of HPDE with relative density of 0.94, in order to obtain an internal liner with thickness of 15 mm. The parameters of the heating and cooling cycles are substantially similar to those of the connection part in the form of a bend.

FIGS. 1 and 8A show a connection part 1a that is coated with an internal liner 2 of the present invention, the part being constituted by a pipe element 1a-1 suitable for connecting together two pipe elements extending in two perpendicular directions via each of its open tubular ends 1a'.

FIG. 8B shows a lined connection part of the invention in the form of a T suitable for connecting together three pipe elements via each of its tubular ends 1a', namely:
two pipe elements 1b co-operating with the two opposite tubular ends 1a' disposed at 1800 from each other; and
a third pipe element of smaller diameter, disposed at 90° relative to the other two pipe elements 1b that are in alignment, said third pipe element 1b co-operating with the open tubular end 1a' of axis that is disposed at 90° relative to the other two open tubular ends 1a' of said T element 1a-2.

FIG. 8C shows a connection part constituted by a tapering tubular sleeve 1a-3 having two open tubular ends 1a' lying on the same axis XX', but in which the inside diameter of the circular cross-section at one of the open tubular ends 1a' is smaller than the inside diameter at the other open tubular end of said connection part.

These three connection parts 1a-1, 1a-2, and 1a-3 have their inside surfaces covered in liners constituted by a layer of thermoplastic material 2 that is not entirely cylindrical in shape. In the T-shaped connection parts 1a-2 and in the connection part in the form of a tapering tubular sleeve 1a-3, said inside surface respectively comprises a combination of two cylindrical portions disposed at 900 (connection part 1a-2) or disposed end to end (connection part 1a-3).

In a preferred version of the invention, multilayer lining is performed so as to obtain a first layer of said covering having a given thickness in contact with the wall, followed by at least one second covering layer of a different thermoplastic material, generally a material presenting improved characteristics compared with the first. Said second material is generally more "noble" and thus more expensive than the first, so its thickness is kept down to the necessary minimum. The rotary lining method is then slightly different from the method described above, since the second thermoplastic material in the form of a micronized powder is contained in a closed reservoir secured to one of the covers and situated remote from the walls of the connection element. Once the first material has melted fully and bonded to the walls, after a known length of time, the reservoir containing the second material is opened, either automatically by a mechanical timer, or manually by the operator acting from the outside. The second thermoplastic material is then released and begins to melt, covering the first material until all of the micronized powder has melted, thereby obtaining the desired final thickness for the liner. Such a multilayer technique makes it possible to obtain a liner that is proof against gas and/or hydrocarbons migrating, by using a second material that is proof against gas and/or hydrocarbons, said second material advantageously being applied as a thin layer with thickness of only a few millimeters, because of its high cost. It is possible in the same manner to apply a second material that is constituted by a mixture of the first material and of an addition material, for example a material that facilitates sliding such as Teflon, or that improves resistance to abrasion, said addition material being dispersed in very small quantities in the base material. It remains within the spirit of the invention to apply a third material or even a fourth or more, in order to build up the total thickness of the liner.

FIGS. 8A, 8B, and 8C show how to assemble an open tubular end 1a' of a connection part 1a with an open tubular end 1b' of a pipe element 1b with the help of a junction sleeve 3.

In the method of the invention, said junction sleeve 3 is inserted:
via one end of said sleeve into the inside of the open tubular end 1a' of said connection part, said end not having a connecting flange; and
via the other end of said sleeve, into the inside of the corresponding end 1b' of said pipe element, said end not having a connecting flange; and
bringing together and welding 5 said ends of said connection part and of said pipe element over said junction sleeve 3, as shown in FIG. 5.

The sleeve 3 presents substantially the same inside diameter as the internal liner 2-2 of said connection part.

More particularly, the following steps are performed:

a) providing a said connection part, a said pipe element, and a said tubular junction sleeve, such that:

the internal liners of thermoplastic material at the open ends 1a', 1b' of said connection part and of said pipe element each comprise an end portion 2a, 2b of thickness that is reduced relative to the thickness of the remainder 2c of said liner, said end portion 2a, 2b thus defining an internal surface of revolution of inside diameter that is greater than that of the remainder of said internal liner and terminating at a certain distance d from the ends of said connection part and of said pipe element, respectively; and said sleeve presents at each of its ends an end portion 3a, 3b of thickness that is reduced relative to the thickness of the central portion 3c of said sleeve, said end portion 3a, 3b of the sleeve defining an outside surface of revolution of outside diameter that is smaller than that of the central portion 3c of the sleeve and less than the inside diameter of said non-lined end portions of said connection part and of said pipe element, and a cylindrical inside surface of inside diameter that is substantially the same as that of the main portion of the liner of said open tubular ends and of said central portion of the sleeve, which sleeve 3 presents substantially the same inside diameter as said internal liner of the main portions of the connection parts and of said pipe element; and b) inserting said tubular junction sleeve inside said open tubular ends having liners of reduced thickness in said connection part and said pipe element, so as to overlap said reduced-thickness end portions of the liners.

FIG. 5 shows an assembly of the invention with a tubular junction sleeve 3 providing the junction between the tubular ends 1a', 1b' of a connection part 1a and of a straight pipe element 1b having internal liners 2 that are assembled end to end. Said tubular ends 1a' and 1b' are welded 5 to each other and each said tubular end 1a', 1b' comprises:

an internal liner of thermoplastic material 2, preferably identical on both sides, presenting at each end an end portion 2a, 2b of thickness reduced relative to the thickness of the main portion 2c of said liner, defining an internal surface of revolution of inside diameter that is greater than that of the main portion 2c of said liner and terminating at a certain distance d from the end of said pipe element, and of axis XX' substantially coinciding with the axis of said tubular ends 1a', 1b'; and a single tubular junction sleeve 3 of material that withstands corrosion, preferably an Inconel alloy, having substantially the same inside diameter as said liner, interposed inside the abutting ends of the two tubular ends 1a', 1b', so as to overlap said end portions of the two liners 2a, 2b, said sleeve presenting at each of its ends an end portion 3a, 3b of thickness that is reduced relative to the thickness of the central portion 2c of said sleeve, said end portions 3a, 3b of the sleeve defining an external surface of revolution of outside diameter less than that of the central portion 3c of the sleeve and an internal cylindrical surface having the same inside diameter as the main portion of the liner and of the central portion 3c of the sleeve, its axis XX' coinciding substantially with the axis of the tubular ends 1a', 1b'.

In FIG. 7A, said external surface of revolution of each end portion 3a, 3b of said sleeve constitutes a notched surface $3_2$, in particular a surface having three to five notches $3_2$ with slopes, in particular as shown in FIG. 7A, at an angle α that is less than 45°, preferably about 30°, and at an angle β that is greater than 45°, preferably about 60°, enabling insertion and anchoring against the inside surface of the end portions 2a, 2b of reduced thickness of the corresponding liner, the end notch giving the sleeve an end with a substantially tapering chamfer 3-1, as shown in FIG. 7A. This provides a mechanical connection between said two surfaces, the outside surface of the sleeve and the inside surface of the liner, merely by forcing said sleeve into engagement along the longitudinal axial direction inside a said tubular end 1a', 1b'.

The outside diameter of said cylindrical central portion 3c of the sleeve is smaller than the inside diameter of the non-lined ends 1-1a and 1-1b of the steel walls of said tubular ends 1a', 1b', such that said sleeve is not in direct contact with said steel walls and co-operates therewith and between the ends 2-1 of the liners on either side of said sleeve, to define an annular chamber 17.

Said sleeve is inserted against the end portions 2a, 2b of reduced thickness of the liner until the end 2-1 of the liner comes into abutment against a shoulder 3-3 defining the boundary between said central portion 3c of the sleeve and said smaller-diameter end portion 3a, 3b of the sleeve.

In a variant embodiment (not shown), said sleeve is inserted against the end portion of the liner until the end 3-1 of the sleeve comes into abutment against the shoulder 2-2 defining the boundary between the main portion and said reduced-thickness end portions 2a, 2b of the liner, thereby advantageously reducing turbulence in the transition zone between the main portion of the liner 2 and the tubular junction sleeve.

In FIGS. 8D to 8F, there can be seen another way of performing assembly when there is a first connecting flange 6a for assembly with a second connecting flange 6b of a rectilinear pipe element 1b, with this method of assembly being more particularly suitable for performing at the bottom of the sleeve under high pressure conditions, in particular at great depth.

In this method, the following steps are performed:

a) initially the following are used:

a said connection part 1a including a said first connecting flange 6a to which it is welded 5-1, with the entire combined inside surface of the connection part and of said first connecting flange being covered in a said layer of thermoplastic material, the external bearing face 6a' of said first flange for bearing against said second flange not being covered in a said layer; and a said pipe element 1b having at its end a said second connecting flange 6b to which it is welded 5-1, the entire combined inside surface of said pipe element and of said second connecting flange being covered in a said layer of thermoplastic material, the external bearing face 6b' of said second flange for bearing against said first flange not being covered in a said layer; and b) machining the internal liners 2 of thermoplastic material at the end of said connection part having a said first flange and at the end of said pipe element having a said second flange so as to create in each of said internal liners an end portion 2a, 2b of thickness that is reduced relative to the thickness of the remainder 2c of said liner, said end portion thus defining an internal surface of revolution of inside diameter greater than that of the remainder of said liner, and terminating at a certain distance d from the end of said connection part and of said pipe element respectively, such that the inside surfaces 1-1a, 1-1b of said first and second flanges are not lined; and c) inserting into each of said open ends of said first and second flanges, tubular junction half-sleeves 4 for making the junctions between said connection part and said first flange and also between said pipe element and said second flange:

each said half-sleeve 4 presenting:

at its front end, a front end portion of tubular wall 4a of thickness reduced relative to the central portion 4c of the tubular wall of said half-sleeves; and at its rear end, a rear end portion of tubular wall 4b of thickness greater than that of the central portion 4c of said half-sleeve, the rear end portion 4b having an outside diameter that corresponds substantially to the diameter of the inside surface 1-1a, 1-1b of said first or second non-lined flanges as the case may be, each said rear end portion forming a shoulder, said front end portions 4a of the half-sleeves defining an outside surface of outside diameter smaller than that of the remainder 4c of the wall of said half-sleeves and a cylindrical inside surface of substantially the same diameter as the cylindrical inside surfaces of the main portions of said liners of said connection part and of said pipe element and of the remainder of the tubular walls of said half-sleeves; and each half-sleeve being inserted in such a manner that said front end portions 4a with reduced wall thickness of said half-sleeves 4 overlap with said end portions 2a, 2b of reduced thickness of said liners in said connection part and said pipe element respectively; and said shoulder-forming rear end portions 4b of said half-sleeves coming into contact with said first and second flanges respectively beside their open ends; and . . . ;

the rear ends of said half-sleeves 4 reaching the external bearing faces 6a', 6b' of said first and second flanges, respectively; and d) welding 5-2 said half-sleeves to said first and second flanges respectively at said rear ends of said half-sleeves and external bearing faces 6a', 6b' of said first and second flanges respectively; and e) moving together and fastening said first and second flanges, with a toroidal gasket being interposed between them, preferably providing metal-on-metal sealing.

In this method, the steps a) to d) can be performed at the surface in a manufacturing site, or where appropriate on board a pipe-laying ship, as explained below. However step e) can thus be performed in situ where laying is taking place, and in particular at great depths.

Said tubular junction sleeves 3, and where appropriate said tubular junction half-sleeves 4 are made of material that withstands corrosion, preferably of the stainless steel or Inconel alloy type; and the outside diameter of the cylindrical central portion 3c, 4c of said sleeve or of said half-sleeves, as appropriate, is less than the inside diameter of said non-lined ends 1-1a, 1-1b of the steel walls of said connection part 1a, of said pipe element 1b, or where appropriate of said first and second flanges 6a and 6b, respectively.

The non-lined rear ends 1-1a, 1-1b of the inside surfaces of said first and second flanges respectively in contact with said rear end portions 4b of said half-sleeve, and said external bearing faces 6a', 6b' in the welding zone 6d between said first and second flanges and the rear end portions 4b of said half-sleeve are locally covered in the same anti-corrosion metal 6d as that constituting said half-sleeve.

The corrosion-resistant metal is preferably Inconel alloy. This can be placed in the contact and welding zone 6d between said flanges and said half-sleeves 4 being deposited by an electric arc in a previously-machined zone. Thereafter it its possible to make a groove 6e in said zone 6d that is to receive an intermediate toroidal gasket 6c. During rotary molding, said flange 6a is merely closed by a solid flange backing member having a sealing gasket, e.g. providing metal-on-metal sealing and co-operating with said groove 6e. By proceeding as mentioned above, continuity of the anti-corrosion metal is provided, e.g. continuity of Inconel, between said half-sleeve, said connecting flanges 6a and the gasket, likewise made of anti-corrosion metal 6c.

As shown in FIGS. 6A, 6B, at the end of the lining process, the liner is cut flush 6a-2 with said steel connection part, and then a machining machine 12 is installed on the face of the first end of the pipe element. It is constituted in known manner by a structure 12a carrying a motor (not shown) that sets the tool-carrier shaft 12c into rotation, a device 12e that moves the tool-carrier in the direction XX', and a device 12f that moves the machining tool 12d radially. The machine is fitted with centering means 12b that serve to adjust the position of the axis XX' of said machine so as to make it coincide with the axis of the pipe element, and so as to be able to machine the inside of the liner at its ends, in a manner that is entirely concentric with said steel pipe.

After the liner has been machined to have the required profile at each of its ends, the tubular junction sleeve 3 of FIG. 7 is forced into the end 1a' of the connection part 1a which is then terminated and ready to be shipped to the assembly site.

A tubular end 1a' of said connection part in which a said tubular junction sleeve 3 has been inserted presents a liner 2 with an end portion 2a of reduced thickness. The projecting portion of said sleeve defines a male end 3-4 suitable for being assembled with an end that does not have such a sleeve and that defines a female end 2-3 of a said pipe element 1b.

The opposite configuration is also possible, with said sleeve constituting a male end of a said pipe element 1b for insertion into a female end of a said connection part.

In FIGS. 9B and 9C, there can be seen how assembly is performed between a unit length of pipe 1b and a said connection part 1a, both of which are lined, with assembly taking place during on-site installation and being performed on board a laying ship 13a fitted with a J-lay tower 13b, as shown in FIG. 9A. For this purpose, the end pipe element 1b of an already-laid lined pipe is held securely in suspension from the bottom of the tower, and a lined connection part 1a is transferred in known manner from the horizontal position to an oblique position corresponding to the angle of inclination of the tower so as subsequently to be placed on the axis of the lined end pipe element 1b. A said connection part 1a for assembly is then moved axially towards the suspended end pipe element 1b. The female end 2-3 having no tubular junction sleeve of a connection part 1a is then introduced over and inserted by force around the male end 3-4 of the stationary tubular junction sleeve that projects from the pipe element 1b in the longitudinal direction XX' axially inside said female end 2-3, and then the non-lined ends of the steel walls of the connection part 1a and of the pipe element 1b are butt-welded together at 5. The top portion of the sleeve 3 penetrates into the end of the connection part 1a for assembly until it comes into contact with the end 2-1 of the liner that has previously been machined with great precision. Said sleeve is inserted against the reduced-thickness end portion 2b of the liner until the end 2-1 of the sleeve comes into abutment against a shoulder 3-3 marking the boundary between said central portion 3c of the sleeve and said smaller thickness end portion 3a, 3b of the sleeve. Since said connection part 1a is nearly vertical, its own weight then suffices to enable the sleeve to penetrate fully into the liner so as to reach the configuration shown in FIG. 9C, where said connection part and said pipe element are held apart at a distance of a few millimeters, e.g.

merely by using spacers (not shown) so as to make it possible in known manner to perform the welding 5. In FIG. 9C, towards the top and the left, there can be seen the chamfered walls 5' of the steel pipe spaced apart by a few millimeters, and towards the bottom and the right a completed weld 5.

As shown in FIGS. 9B and 9D, spacers 16 are advantageously installed, e.g. three spacers that are uniformly spaced apart around the periphery of the tubular junction sleeve and that are situated close to the welding zone 5, so as to improve the engagement of said sleeve 3 in said steel pipe $1_1$. These spacers are advantageously machined to precise dimensions and are inserted by force from the outside into the gap between the outside surface of the central portion 3c of said sleeve and the inside surface of the steel wall at the non-lined end 1-1a, 1-1b of said connection part or of said pipe element for which said sleeve constitutes a male end.

The spacers 16 are advantageously made of a material that does not conduct, and that is therefore not metal, and that withstands the temperature generated at the location in question by the process of assembly by welding on board the installation ship 13a. Thus, they are made either of composite materials or else of ceramic, or even more simply out of a sand-and-cement mortar. In a preferred version, the spacers are fabricated merely by injecting a limited volume of mortar by means of a syringe so that on spreading out, e.g. over a spot having a diameter of 4 cm, serves to create said spacer in situ, without any need for prior adjustment of thickness, thereby securely holding said sleeve relative to said pipe. FIG. 9D is a detail view of such spacing.

When the weight of said connection part or of said pipe element is not sufficient to ensure that the tubular junction sleeve is inserted naturally, then the carriage handling said string within the J-lay tower is advantageously weighted so as to provide sufficient extra force capacity. In a preferred version, an actuator device is used that is secured to the outside of said part 1a or string 1b and that then drives insertion of the tubular junction sleeve 3.

In a preferred version shown in FIGS. 1 and 9B, a passivation agent is advantageously placed around the tubular junction sleeve before its insertion during construction of the string, or while it is being installed within the J-lay tower; under such circumstances, said passivation agent is positioned in the male end zone 3-4.

After the connection part and the pipe element have been joined together, the outside surface of the central portions of the sleeves or half-sleeves and the corresponding inside surface of the steel wall of the non-lined end portion of said connection part, of said pipe element, or where appropriate of said first and second flanges, together define an annular chamber, because of the difference between their respective outside and inside diameters. This makes it possible to avoid any direct contact between the stainless steel alloy or Inconel of the sleeve and the steel of the pipe element. Any such direct contact could lead, in the event of water penetrating into said chamber when the pipe is a water injection pipe, to electrochemical phenomena whereby the steel pipe is corroded insofar as said mechanical connection between the sleeve and the liner is not necessarily leaktight. The absence of contact between the sleeve and the steel wall of the pipe makes it possible to perform conventional welding of the type commonly used for welding pipe lines and makes it possible to avoid expensive welding using a noble alloy identical to the alloy that is used to make said sleeve, and in particular Inconel alloy.

Nevertheless, in one implementation, said tubular junction sleeve may be made of a composite material of the carbon epoxy type, said sleeve being made for example by winding filaments on a blank and then machining in its end zones in order to obtain the required notches.

In a preferred version shown in FIG. 10, the annular chamber 17 that exists between the sleeve, the liner ends 2-1, and the steel outside wall, has a quasi-impressible cross-linkable material injected therein such as a polyurethane, an epoxy, an acrylic, or indeed a gel of thick consistency that is not soluble in water, so as eliminate all bubbles of air present in said chamber. For this purpose, said material is injected either from outside the pipe, as shown in the bottom of FIG. 10, or from inside through the tubular junction sleeve 3, as shown further up in the same FIG. 10. On proceeding from the outside, a tapped hole 14a is initially made through the wall and said chamber is put into communication with the outside. A vacuum chamber 15 is then pressed against the outside of the pipe in leaktight manner, the vacuum chamber having a duct 15a for delivering the cross-linkable material and also having an isolation valve 15b, together with a pipe 15c for drawing-down the vacuum and an isolation valve 15d.

The filling sequence is then as follows:
closing the valve 15b and opening the valve 15d; and
drawing-down a vacuum in the chamber 17; and
closing the valve 15d and opening the valve 15b; and
filling the chamber 7 completely with cross-linkable material; and
removing the vacuum chamber 15; and
closing the orifice with the threaded plug 14b.

When proceeding from the inside, a small hole 14, e.g. having a diameter of 3 mm, is previously formed through the tubular junction sleeve 3, and in similar a vacuum chamber 15 provided with orifices and isolation valves is put into place and the same sequence of operations as described in detail above is performed, except that for the last step, the filler hole is left open and it suffices to remove any traces of material from the inside face of the tubular junction sleeve. Once the material has cross-linked, it acts as a plug.

FIGS. 11A to 11F are diagrams showing the results of finite-element calculations concerning the successive stages of engaging the tubular junction sleeve, and they show how the thermoplastic material of the liner is deformed plastically, and also how the tubular junction sleeve deforms elastically. Said deformation of the sleeve is at its maximum at the top 3-5 of the chamfered end 3-1 of FIG. 11F, which zone also corresponds to the maximum plastic deformation of the thermoplastic material of the liner, thereby creating a sealing ring. The multiple notches 3-2 in the outside surface of the tubular junction sleeve plastically deform, to a lesser extent, said sleeve at the tops of the notches 3-2, thereby creating additional sealing rings. Said tubular junction sleeve then comes into abutment against the liner. Said sleeve is inserted against the reduced thickness end portions 2a, 2b of the liner until the end 2-1 of the liner comes into abutment against a shoulder 3-3 marking the boundary of said central portion 3c of the sleeve and said smaller thickness end portion 3a, 3b of the sleeve. The prestress thus obtained in the tubular junction sleeve, in association with the plastic deformation of the thermoplastic material, then clampingly engages said tubular junction sleeve in the liner and thus in the steel pipe. The axis XX of the tubular junction sleeve then coincides with the axis of the steel pipe, thus providing guidance and making it much easier to insert the female portion 2-3 of the pipe element or of the connection part for assembly in the male portion 3-4 at the end of the connection part or respectively the end pipe element of a pipe that has already been assembled, during installation in the J-lay tower, as explained above with reference to FIGS. 9A to 9C.

Over time, the thermoplastic material will be subjected to creep and the cavities 3-6 between the notches 3-2 become progressively filled in with said thermoplastic material over a period of several years or tens of years. In the same manner, the tubular junction sleeve presenting maximum initial deformation at 3-5 will, merely by its elasticity, return to its natural cylindrical shape, thereby acting as a spring and compensating for said creep of the thermoplastic material, thus continuing to ensure that the annular chamber 17 is leaktight.

In FIG. 12A, there can be seen the lined pipe subjected to a service pressure P=50 megapascals (MPa), while the chamber 17 remains substantially at atmospheric pressure. This leads to radial expansion of the tubular junction sleeve which then alone takes up the bursting force throughout the zone of the chamber 17, since the steel pipe is substantially unstressed in said zone by said bursting effect. Compared with FIG. 12A, FIG. 12B is an enlargement of the notched zone of the tubular junction sleeve and it shows the tops of said notches penetrating into the thermoplastic material of the liner, and also the creep of said thermoplastic material towards the chamber 17 created by the pressure P acting on the inside of the lined pipe, in service.

The sleeves 3 and half-sleeves 4 are described as being made of a material that withstands corrosion, and more particularly as being made of a metal, even more particularly of an Inconel alloy, however it remains within the spirit of the invention to consider using a composite material, e.g. a carbon or glass fiber composite within a bonding matrix, e.g. of the epoxy or polyurethane type. Various methods can be envisaged for fabrication, for example winding a filament on a mandrel, overmolding organized fibers with a fluid resin, or any other method suitable for making bodies of revolution that present great mechanical strength. The resins should be selected so that they can withstand the heat that is generated by welding the pipes together, during string assembly on site, within the J-lay tower, and a heat shield, e.g. of ceramic fibers, can advantageously be interposed between said tubular sleeve and said steel pipe, in register with the junction.

The ends of the tubular junction sleeve 3 and of the half-sleeve 4 are described as presenting notches in the form of surfaces of revolution, however it would remain within the spirit of the invention if the notching were to be constituted by a helical thread, thus being constituted by a single projection taking a plurality of turns around the periphery of said tubular junction sleeve. Thus, putting the tubular junction sleeve into place on the prefabrication site could be done either by pushing it in using a press, as explained above, or else by screw-fastening until said tubular junction sleeve comes into abutment against the end face of the liner. In the same manner, on-site installation within a J-lay tower can be performed either by being pushed in directly, or by screw-fastening, with the notched surface of the second end of the tubular junction sleeve either constituting a surface of revolution or being helical in shape.

The invention claimed is:

1. A method of covering the inside surface of a steel connection part having an empty inside volume defined by said inside surface, with a liner constituted by a layer of substantially uniform thickness of a thermoplastic material, said connection part having at least two open tubular ends suitable for connecting respectively to at least two steel pipe elements having the same internal liners, the method being characterized in that the following steps are performed:
   a) closing said open ends of said connection part with covers, at least one of said covers presenting a filler orifice with an isolation valve suitable for enabling granules of thermoplastic material to be introduced into said inside volume, and preferably also a ventilation or purge orifice with an isolation valve, and all other openings, if any, in said part are plugged;
   b) introducing said granules of said thermoplastic material into said inside volume through said filler orifice, in an amount that is necessary and sufficient for obtaining a layer of said thermoplastic material over all of said inside surface with a substantially uniform desired thickness;
   c) heating the walls of said connection part defining said inside volume to a temperature enabling said granules to be melted;
   d) causing said connection part to turn simultaneously about at least two different axes of rotation for a length of time that is sufficient and at a speed that is sufficiently low to enable said thermoplastic material to melt on said inside surface and to be distributed in substantially uniform manner over all of said inside surface; and
   e) while maintaining said rotation, cooling said connection part or allowing said connection part to cool prior to removing said covers.

2. The method according to claim 1, wherein the internal pressure is maintained against said walls covered in said material within said inside volume during said cooling.

3. The method according to claim 1, wherein the pressure inside said volume is increased before cooling by pressurizing said inside volume with a gas or water under pressure that is introduced via ventilation or purge orifice, and said increased pressure inside said volume is maintained during cooling, preferably at a value of not less than $10^6$ Pa.

4. The method according to claim 1, wherein, in step c), said walls are heated by placing said part in an oven.

5. The method according to claim 1, wherein in step d), said connection part is caused to rotate with the help of a multidirectional rotation device for rotary molding.

6. The method according to claim 1, wherein use is made of granules of polyethylene, polypropylene, polyamide, and polyvinyl.

7. The method according to claim 1, wherein said connection part is a bend pipe element suitable for enabling two pipe elements that extend in different directions to be connected together by being connected to respective ends of said bend element constituting said connection part.

8. The method according to claim 1, wherein said connection part is a T-shaped element suitable for enabling three pipe elements to be connected to its respective ends, the elements extending in two directions making between them an angle lying in the range 0 to 90°, and preferably of 90°.

9. The method according to claim 1, wherein said connection part is a tapering tubular sleeve presenting two tubular ends of circular cross-sections that are of different inside diameters, suitable for enabling two pipe elements of diameters corresponding respectively to the inside diameters of the two tubular ends of said tapering tubular sleeve to be connected thereto.

10. The method according to claim 1, wherein said inside surface is a surface that is not entirely cylindrical.

11. The method according to claim 1, wherein during the cooling step, said inside volume is pressurized with water at high temperature that is cooled by being caused to flow through a heat exchanger enabling said water to lose heat while maintaining the desired level of pressure until all of said connection part and said thermoplastic material applied as a layer thereon is completely cooled.

12. The method according to claim 1, wherein said connection part comprises walls with zones of smaller thicknesses, said zones of smaller thickness being thermally insulated.

13. The method according to claim 1, wherein said covering comprises a first said covering and a second said covering, and wherein:

said first covering is made to obtain a said liner comprising a first layer of a first thermoplastic material; and said second covering is made to obtain a second layer of a second thermoplastic material different from said first material, said second thermoplastic material being contained in a different reservoir and being introduced into said connection part via a said cover once said first material has melted completely and has bonded to said walls, said second material covering said first material and being melted to obtain the desired final thickness.

14. The method according to claim 1, wherein said connection part comprises, at at least one of its tubular ends, a first connecting flange suitable for co-operating with a second connecting flange of one of said two pipe elements for connection to said connection part, and the covering is made continuously over the entire combined inside surface of the connection part and over said connecting flange with a layer of said thermoplastic material, after said first flange has been fastened by welding to the end of said connection part and the open end of said first flange has been closed with one of said covers.

15. The method according to claim 14, wherein said first flange comprises an external bearing face bearing against said second flange and whereby said first flange bears against said second flange, said cover presenting a shape and means for fastening to said flange that enable said layer of thermoplastic material to be made continuously over said inside surface of the connection part and said inside surface of said first connecting flange, and also over said external bearing face whereby said first flange bears against said second flange.

* * * * *